(12) United States Patent
Simenson et al.

(10) Patent No.: US 7,943,862 B2
(45) Date of Patent: May 17, 2011

(54) METHOD AND APPARATUS FOR OPTICALLY TRANSPARENT VIA FILLING

(75) Inventors: Glenn Simenson, Portland, OR (US);
William Antoni, Tigard, OR (US);
Steven Cohen, Hillsboro, OR (US);
Jeffery Howerton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 207 days.

(21) Appl. No.: 12/194,886

(22) Filed: Aug. 20, 2008

(65) Prior Publication Data
US 2010/0044092 A1 Feb. 25, 2010

(51) Int. Cl.
*H01R 12/04* (2006.01)

(52) U.S. Cl. ........ 174/262; 174/263; 174/264; 174/266; 29/832; 29/852; 29/876; 438/22; 438/106; 438/118; 438/121; 438/125; 257/80; 257/81; 257/82; 257/100; 385/2; 385/15

(58) Field of Classification Search .......... 174/262–264, 174/266; 29/832, 852, 876; 438/22, 106, 438/118, 121, 125; 257/80–82, 100; 385/4, 385/15
See application file for complete search history.

(56) References Cited

U.S. PATENT DOCUMENTS

| | | | |
|---|---|---|---|
| 4,155,972 A | 5/1979 | Hauser et al. | |
| 4,161,280 A * | 7/1979 | Kasinskas | 239/1 |
| 4,305,770 A * | 12/1981 | Stiles | 156/180 |
| 5,129,458 A * | 7/1992 | King et al. | 166/295 |
| 5,133,120 A * | 7/1992 | Kawakami et al. | 29/852 |
| 5,293,025 A | 3/1994 | Wang | |
| 5,314,545 A * | 5/1994 | Folts et al. | 134/22.11 |
| 5,348,693 A * | 9/1994 | Taylor et al. | 264/401 |
| 5,376,859 A * | 12/1994 | Kim et al. | 310/334 |
| 5,518,964 A | 5/1996 | DiStefano et al. | |
| 5,593,606 A | 1/1997 | Owen et al. | |
| 5,614,114 A | 3/1997 | Owen | |
| 5,699,613 A | 12/1997 | Chong et al. | |
| 5,747,095 A | 5/1998 | McAllister et al. | |
| 5,757,079 A | 5/1998 | McAllister et al. | |
| 5,787,578 A | 8/1998 | Farooq et al. | |
| 5,801,441 A | 9/1998 | DiStefano et al. | |

(Continued)

FOREIGN PATENT DOCUMENTS
JP 07-201260 8/1995

OTHER PUBLICATIONS

U.S. Appl. No. 11/742,862 Office Action dated Jun. 13, 2008.

(Continued)

*Primary Examiner* — Jinhee Lee
*Assistant Examiner* — Xiaoliang Chen
(74) *Attorney, Agent, or Firm* — Patrick F Leonard (57) ABSTRACT

A method and apparatus for filling a via with transparent material is presented, including the steps of providing a panel having a via, occluding the via with transparent material in a workable state so that a portion of the occluding material is internal to the via and a portion of the material is external to said via. The external and internal portions are separated so the transparent filler material, when set, forms a smooth and featureless surface. This causes the filled via to have a substantially even and uniform appearance over a wide range of viewing angles when lit.

6 Claims, 5 Drawing Sheets

U.S. PATENT DOCUMENTS

| | | | |
|---|---|---|---|
| 5,817,347 A * | 10/1998 | Tamcsin et al. | 425/192 R |
| 5,843,567 A * | 12/1998 | Swift et al. | 428/221 |
| 5,909,266 A * | 6/1999 | Matsuo et al. | 349/187 |
| 5,951,349 A | 9/1999 | Larose et al. | |
| 6,021,564 A | 2/2000 | Hanson | |
| 6,104,087 A | 8/2000 | DiStefano et al. | |
| 6,194,291 B1 | 2/2001 | DiStefano et al. | |
| 6,211,485 B1 | 4/2001 | Burgess | |
| 6,235,544 B1 | 5/2001 | Franklin et al. | |
| 6,383,322 B1 * | 5/2002 | Wang | 156/79 |
| 6,396,082 B1 * | 5/2002 | Fukasawa et al. | 257/79 |
| 6,416,844 B1 | 7/2002 | Robson | |
| 6,427,324 B1 | 8/2002 | Franklin et al. | |
| 6,541,709 B1 | 4/2003 | Franklin et al. | |
| 6,541,712 B1 | 4/2003 | Gately et al. | |
| 6,576,869 B1 | 6/2003 | Gower et al. | |
| 6,599,768 B1 * | 7/2003 | Chen | 438/22 |
| 6,610,960 B2 | 8/2003 | De Steur et al. | |
| 6,627,844 B2 | 9/2003 | Liu et al. | |
| 6,631,558 B2 | 10/2003 | Burgess | |
| 6,635,553 B1 | 10/2003 | DiStefano et al. | |
| 6,834,761 B1 * | 12/2004 | Kesling | 206/63.5 |
| 6,835,960 B2 * | 12/2004 | Lin et al. | 257/81 |
| 6,838,314 B2 | 1/2005 | Chang | |
| 6,881,662 B2 | 4/2005 | Kung et al. | |
| 6,885,788 B2 * | 4/2005 | Iwaki et al. | 385/15 |
| 7,045,221 B2 * | 5/2006 | Carey et al. | 428/647 |
| 7,060,595 B2 | 6/2006 | Ou et al. | |
| 7,096,579 B2 * | 8/2006 | Murata | 29/832 |
| 7,217,375 B2 * | 5/2007 | Lai | 264/1.1 |
| 7,218,798 B2 * | 5/2007 | Aoki et al. | 385/4 |
| 7,230,278 B2 * | 6/2007 | Yamada et al. | 257/80 |
| 7,338,615 B2 * | 3/2008 | Shepherd et al. | 252/62.3 R |
| 7,495,819 B2 * | 2/2009 | Sakurai et al. | 359/296 |
| 7,578,958 B2 * | 8/2009 | Patel et al. | 264/460 |
| 7,632,434 B2 * | 12/2009 | Duescher | 264/12 |
| 2001/0045611 A1 | 11/2001 | Clatanoff et al. | |
| 2002/0113312 A1 | 8/2002 | Clatanoff et al. | |
| 2003/0066679 A1 | 4/2003 | Castro et al. | |
| 2003/0183418 A1 | 10/2003 | Castro et al. | |
| 2003/0190799 A1 | 10/2003 | Kung et al. | |
| 2003/0196987 A1 | 10/2003 | Kung et al. | |
| 2004/0112881 A1 | 6/2004 | Bloemeke | |
| 2004/0140560 A1 | 7/2004 | Harvey et al. | |
| 2005/0077083 A1 | 4/2005 | Mattix | |
| 2005/0176272 A1 | 8/2005 | Rosenau | |
| 2005/0189656 A1 | 9/2005 | Tan | |
| 2006/0091023 A1 | 5/2006 | Bukhari et al. | |
| 2007/0278703 A1 | 12/2007 | Hardy et al. | |
| 2007/0291496 A1 | 12/2007 | Nashner et al. | |

OTHER PUBLICATIONS

U.S. Appl. No. 11/742,862 Office Action dated Mar. 9, 2009.

* cited by examiner

METHOD AND APPARATUS FOR OPTICALLY TRANSPARENT VIA FILLING

FIELD OF THE DISCLOSURE

The field of the technical subject matter relates to methods for filling a via with material and products produced through use of such methods. More particularly it relates to filling very small vias with optically transparent material. Even more particularly it relates to filling very small vias with optically transparent material so that the vias are largely unnoticeable when unlit and provide an even, uniform light when backlit.

BACKGROUND

Projecting a light through a housing to provide information is commonplace. Examples include but are not limited to computer keyboards that include indication lights for functions such as "Caps Lock" or "Num Lock"; computer monitors that include an "on/off" light, automobiles that include lights to indicate whether heated seats are on or off, or whether an air bag is on or off; televisions with indicator lights, and a whole host of other consumer electronics. A common way to provide for such lighting is to provide a projecting light that is visible when the light is off and brightly lit to indicate when the light is on. A collection of lights, or holes for lights, may be disruptive to the objectives of an industrial designer.

Figure 1A:
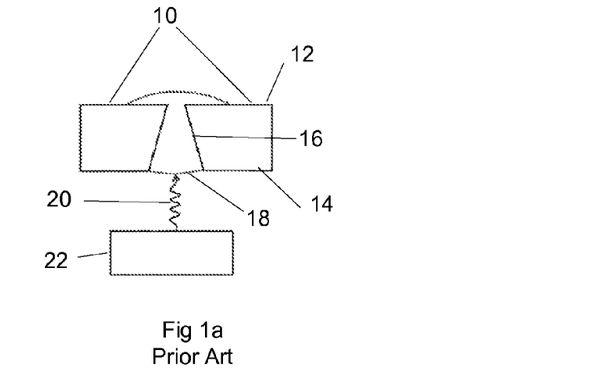
FIGS. 1a, 1b, 1c, and 1d show a prior art method of setting and removing excess material from a filled via.
Figure 1B:
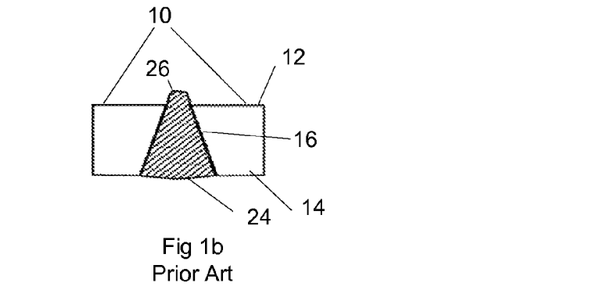
Figure 1C:
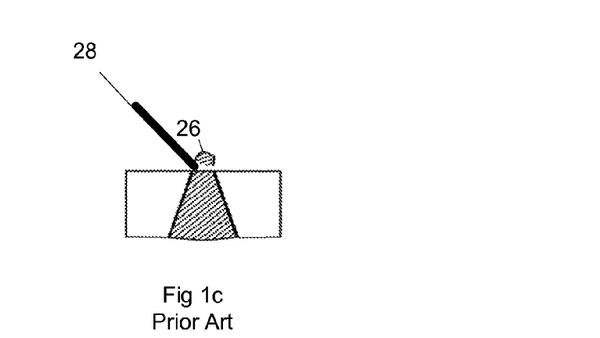
Figure 1D:
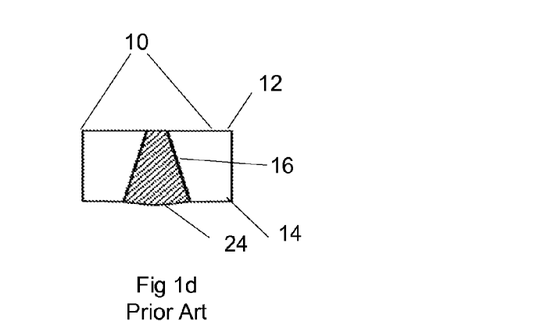

One method of attempting to make the holes for lights less visible is to drill very small, tapered holes and fill them with a transparent material. Holes or vias can be formed using mechanical drills, lasers, electrical discharge machining, or chemical etching. A method for producing optical vias is described in co-pending application Ser. No. 11/742,862 PROCESS FOR OPTICALLY TRANSPARENT VIA FILLING, assigned to the assignee of the instant invention. In this method, the vias are drilled, filled with workable transparent material, the filler transparent material set, and then the surface is cleaned to remove excess set transparent material from the visible surface of the article. By workable we mean that the material is in a plastic state, able to be poured or otherwise inserted into the via and conform to the interior shape of the via, thereby sealing it. This process is illustrated in FIGS. 1a-1d. In FIG. 1a, a substrate 10, having a front or cosmetic side 12 and a back side 14, the substrate 10 having a via 16 filled with a transparent filler 18 being irradiated with ultraviolet (UV) radiation 20 from an ultraviolet light source 22 to set the filler 18. FIG. 1b shows the same substrate 10 and via 16 now filled with set filler 24. Note that the UV radiation has penetrated and set filler that extends beyond front side 12 causing a "finger" 26 of cured filler to extend beyond front side 12. In FIG. 1c, a mechanical device such as a blade is used to remove the finger 26 of set material from front side 12 of the substrate 10. The finger 26 of set material can also sometimes be removed by simply wiping with a cloth if the fingers are small enough. FIG. 1d shows the substrate 10 with via 16 filled with set material 24 following removal of finger 26.

Figure 2:
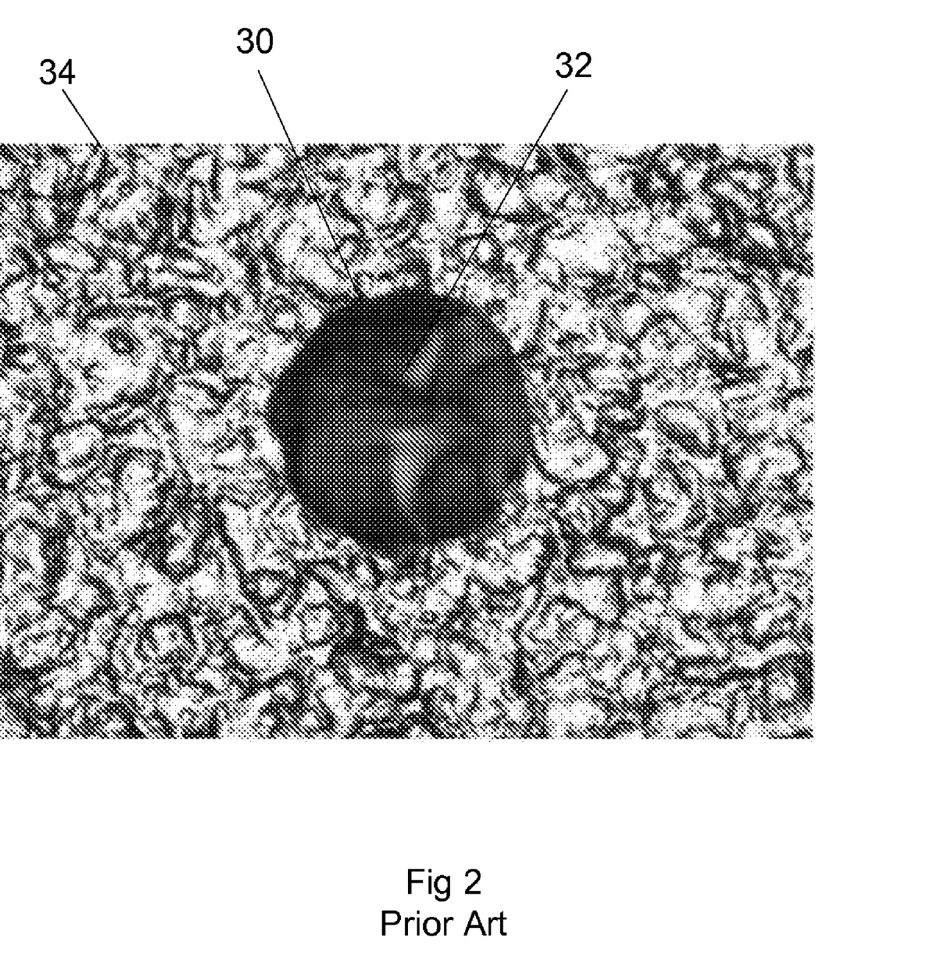
FIG. 2 is an optical microscopic image of a filled via having been set and cleaned with prior art methods.

FIG. 2 shows a high resolution optical microscope image of a via 30 filled with cured filler 32 taken from the front or cosmetic side 34 of the substrate following removal of excess cured filler. As can be seen in FIG. 2, this process leaves a fractured surface in the cured transparent material 32 on the visible side of the article which can make the via unsightly, more visible when unlit and impairs the lit appearance, all of which are undesirable. Accordingly, there remains a need for a method and apparatus for filling vias with a transparent material without surface fractures to improve their aesthetics both when lit and unlit.

SUMMARY OF THE INVENTION

Disclosed are improved methods for occluding a via in a relatively thin substrate or panel with a material that permits the transmission of light through the transparent filler material and products that are made by such methods. By via we refer to a hole formed in a panel or substrate extending from one surface to another characterized by an interior volume bounded by the interior walls of the via and planes which extend the surfaces penetrated by the via. By occlude we mean to introduce material into the interior volume of the via in such a fashion as to completely fill a cross-section of the via. Note that the entire via volume of the via may or may not be completely filled, however, excess material that extends beyond the volume of the via at one surface is typically present. It is one of the goals of the instant invention to disclose methods and apparatuses for removing this excess material in such a fashion as to leave the surface smooth and debris-free and thereby provide an improved filled, light-transmissive via. Panels or substrates to be filled in this manner are typically made of metal, although other materials such as plastic or composite materials may be used. Transparent filler material is introduced into the via in workable form and then made or allowed to set or cure into a hard, optically transparent material that typically adheres to the inside walls of the via to assist in remaining in place in the via. Exemplary materials that may be used include UV-settable polymers, or other polymers that set by exposure to radiation, epoxies or other multi-part compounds that set through chemical reactions, compounds that set through cooling or application of heat and compounds that set by evaporation of solvents or otherwise harden. Any of these materials may be used advantageously in the instant invention.

An exemplary light transmissive material is AHS-1100 Developmental Material manufactured by 3M Company, St. Paul, Minn. Other transparent fillers may be used advantageously, including fillers that can be set by means other than UV radiation. Set refers to the process whereby transparent filler transforms from a substantially liquid or workable state to a solid or relatively hardened state. Transparent fillers can be set by chemical reactions, heat or other electromagnetic radiation, exposure to air, evaporation of solvents or other means. The embodiments described herein can be adapted to use these other setting methods. For example, in the case where the filler is a two-part epoxy that is mixed prior to application to the via and will set in a determined amount of time, the residue can be quickly removed by mechanical or compressed air before the filler sets completely. It is also contemplated that, in the alternative to the materials described above, thermoplastic materials can form the transparent fillers. In this case the excess material would have to be removed prior to the setting by cooling of the thermoplastic materials.

According to one embodiment of the instant invention, the method comprises providing a panel including at least one via and occluding the via with an optically transmissive material, then removing the excess material prior to it becoming set through curing, cooling, evaporation of solvent or otherwise hardened. Removing the excess material prior to setting leaves the exposed surface of the transparent material smooth and unfeatured, thereby making it less visible when unlit and provides more even, uniform illumination when lit. The excess material can be removed by wiping the surface by mechanical means, such as a blade or a squeegee or the excess material can be removed with compressed air. These steps can be followed by wiping with a solvent or vacuum suction or combinations of these methods to remove any remaining excess material. Additionally, light-transmissive vias made according to methods described herein are also disclosed. For example, taught herein is a via having a light transmissive properties wherein the light transmissive via in an article is filled with an optically transmissive material, where the excess optically transmissive material is at least partially removed from the surface of the article prior to the material setting.

BRIEF DESCRIPTION OF THE DRAWINGS

The description herein makes reference to the accompanying drawings wherein like reference numerals refer to like parts throughout the several views, and wherein.

DETAILED DESCRIPTION OF PREFERRED EMBODIMENTS

Figure 3A:
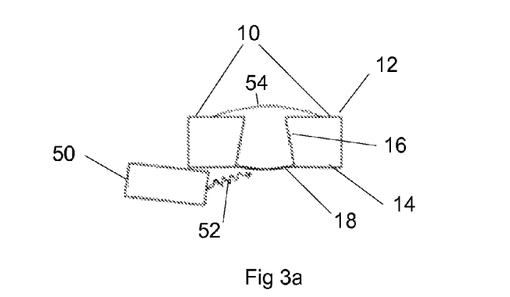
FIGS. 3a, 3b, 3c and 3d show a method of setting and removing excess material from a filled via using mechanical means.
Figure 3B:
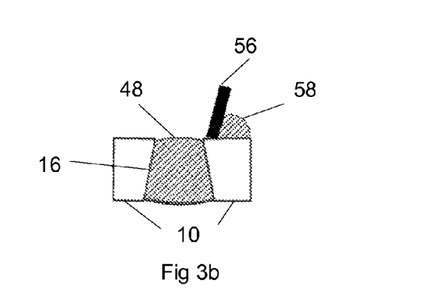
Figure 3C:
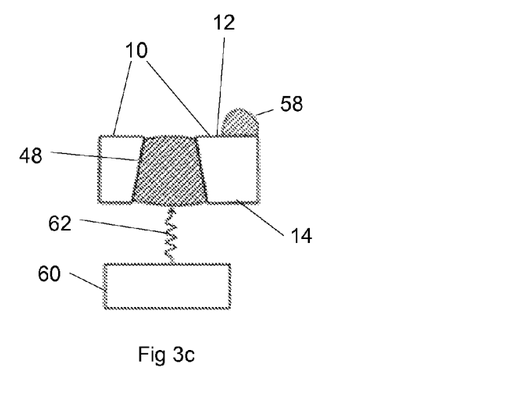
Figure 3D:
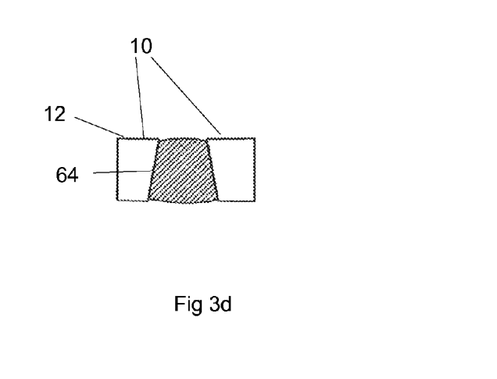

An object of the instant invention is to provide methods and apparatuses for creating improved filled holes in surfaces. FIG. 3a shows a schematic diagram of a substrate 10 with a front or cosmetic side or surface 12 and a back side or surface 14 having a via 16 occluded with a transparent filler 18. The transparent filler 18 is partially set using a UV light source 50 emitting UV light 52. Note that the UV light is being directed to the substrate at an angle close to parallel with the back side 14 of the substrate to prevent radiation from penetrating through the via 16 and setting the portion of filler 54 that extends beyond the front surface 12. FIG. 3b shows the substrate 10 and partially set filler 48 in the via 16. Since the portion of the partially set filler 48 that extends beyond the front surface 12 is not set, it can be removed using a mechanical blade or squeegee 56 wiped across the surface, removing excess filler 58 from the immediate vicinity of the via 16. FIG. 3c shows the substrate 10 with the partially set filler 48 and the excess unset filler 58 on the top surface 12 of the substrate 10. In this embodiment, UV light source 60 is placed more perpendicular to the back surface 14 so that the UV light rays 62 penetrate the partially set filler 48 all the way to the top surface 12 and thereby complete the setting process. In other embodiments the excess filler material can be removed prior to any setting taking place. FIG. 3d shows the substrate 10 with the completely set filler 64 after being cleaned to remove the unset filler remaining on the top surface 12. This cleaning can be accomplished by either vacuum or solvent wash or other equivalent methods and can be performed either before or after the material in the via has been finally set.

Figure 4A:
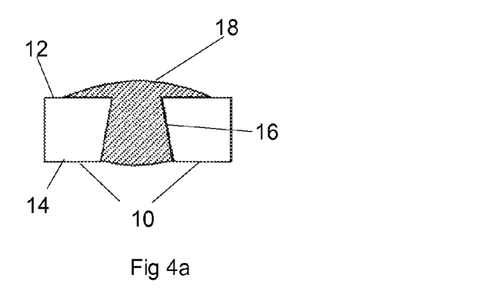
FIGS. 4a, 4b, and 4c show a method of setting and removing excess material from a filled via using an air knife and vacuum.
Figure 4B:
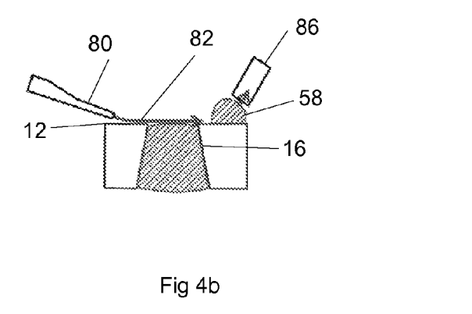
Figure 4C:
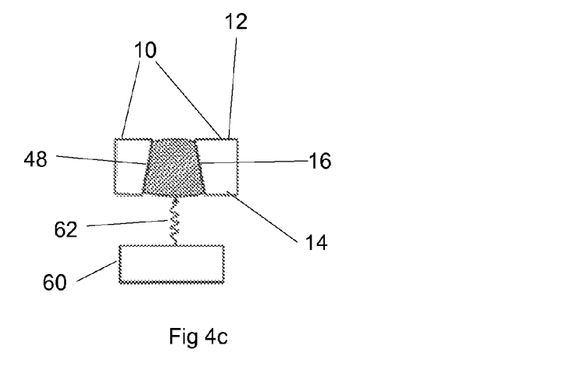

Another embodiment of the instant invention is illustrated in FIGS. 4a-4c. FIG. 4a shows a substrate 10 with a front side 12 and a back side 14 with a via 16. Via 16 is occluded with workable transparent filler 18. In FIG. 4b, an air knife 80 is used to direct a compressed air stream 82 onto the top surface of the substrate 12 to remove excess filler 58 from the immediate vicinity of the via 16. In this embodiment of the invention, a vacuum nozzle, 86 removes the excess filler 58 from the top surface 12 once it has been moved away from the via. FIG. 4c shows the partially set filler 48 in the via 16 being set using UV radiation 62 from a UV source 60 from the back surface 14 of the substrate 10. It is also contemplated that the setting could be by heating, cooling, evaporation of solvents, chemical reaction or other means. Following setting, the front surface 10 may be wiped with solvent to remove any remaining traces of excess filler.

Figure 5:
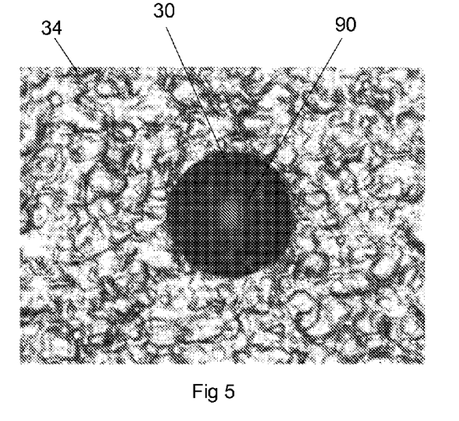
FIG. 5 is an optical microscopic image of a filled via processed according to an embodiment of the instant invention.

FIG. 5 shows an optical microscope picture of a filled via 30 produced by the instant invention taken from the cosmetic or front side 34. Note the smooth appearance of the filler 90, which makes the filled via less noticeable when unlit and makes the via appear more evenly illuminated from a wider range of viewing angles.

Figure 6:
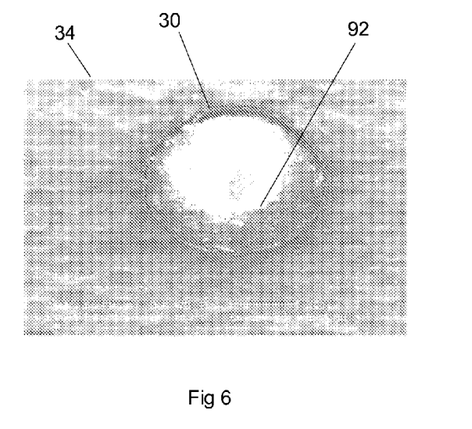
FIG. 6 is a scanning electron microscope image of a filled via processed according to an embodiment of the instant invention.
Figure 7:
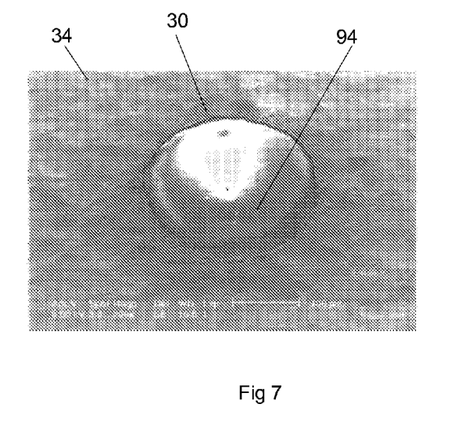
FIG. 7 is a scanning electron microscope image of a filled via processed according to an embodiment of the instant invention.

FIG. 6 shows a scanning electron microscope image of a via 30 taken from the front side 34 of a panel, filled with transparent material 92 that has been prepared according to an embodiment of the instant invention using a mechanical means to remove the excess unset filler. While the appearance of the filled via is greatly improved over the prior art, for example as shown in FIG. 2, a small amount of debris and surface texture is apparent on the set filler. FIG. 7 shows a scanning electron microscope image of a via 30 with a transparent filler 94 taken from the front side 34 of a panel, processed according to an embodiment of the instant invention that uses compressed air and vacuum to remove excess filler from the via. This picture shows that the filler 94 has no detectable residue and no apparent surface texture.

It will also be appreciated that details of the preferred embodiments can be interchanged and still be within the bounds of the teachings of this invention.

What is claimed:

1. A method of filling a via with transparent material including the step of providing a panel having a via, said method comprising:

occluding said via with said transparent, settable material in a workable state, a first portion of said occluding transparent material substantially internal to said via and a second portion of said occluding transparent material substantially external to said via;

substantially setting said first portion of said occluding transparent material substantially internal to said via while leaving said second portion of said occluding transparent material substantially external to said via in a workable state; and separating said first portion of said occluding transparent material substantially external to said via and said second portion of said occluding transparent material substantially internal to said via.

2. The method of claim 1 where said first portion of said occluding transparent material substantially external to said via and said second portion of said occluding transparent material substantially internal to said via are separated by directing high velocity fluid at said panel.

3. The method of claim 1 where said first portion of said occluding transparent material substantially external to said via and said second portion of said occluding transparent material substantially internal to said via are separated by sweeping a mechanical blade substantially flush with said panel.

4. The method of claim 1 including the further step of applying a vacuum to said external portion.

5. The method of claim 1 including the further step of applying a solvent to said external portion.

6. The method of claim 1 where said setting is done by one of radiation, heat, cooling, evaporation, or chemical reaction.

* * * * *

UNITED STATES PATENT AND TRADEMARK OFFICE
CERTIFICATE OF CORRECTION

| | | |
|---|---|---|
| PATENT NO. | : 7,943,862 B2 | |
| APPLICATION NO. | : 12/194886 | |
| DATED | : May 17, 2011 | |
| INVENTOR(S) | : Glenn Simenson et al. | |

It is certified that error appears in the above-identified patent and that said Letters Patent is hereby corrected as shown below:

Column 4, line 57, "first" should be changed to --second--;
Column 4, lines 58-59, "second" should be changed to --first--;
Column 4, line 61, "first" should be changed to --second--;
Column 4, line 63, "second" should be changed to --first--;
Column 4, line 66, "first" should be changed to --second--; and
Column 5, line 1, "second" should be changed to --first--.

Signed and Sealed this
Fourth Day of September, 2012

David J. Kappos
*Director of the United States Patent and Trademark Office*